United States Patent Office 2,906,613
Patented Sept. 29, 1959

2,906,613

SUPPRESSION OF FUEL ICING

Ivor W. Mills, Glenolden, Pa., assignor to Sun Oil Company, Philadelphia, Pa., a corporation of New Jersey No Drawing. Application June 21, 1956
Serial No. 592,733

11 Claims. (Cl. 52—.5)

This invention relates to improved spark ignition internal combustion engine fuel or jet engine fuel having reduced icing tendencies.

Carburetor icing is a serious problem in the operation of spark ignition internal combustion engines. Such icing occurs as a result of vaporization of the gasoline fuel in the carburetor under certain conditions of temperature and humidity, and the icing results in such deleterious effects as plugging of the fuel inlet into the carburetor with consequent engine stalling.

Icing is also a serious problem in the operation of jet propelled aircraft. At temperatures encountered during jet aircraft flight, water which is present in the jet fuel freezes, causing clogging of fuel lines and filters with resulting operational difficulties.

In practice of the present invention, carburetor icing in spark ignition internal combustion engines and icing in jet engine operation are alleviated or substantially completely overcome through the use of novel fuel anti-icing additives.

Anti-icing additives which are used in this invention are tri-(hydroxymethyl) aminomethane and derivatives thereof having the following structural formulas:

$$R'-O-CH_2$$
$$R'-O-CH_2-C-NR_2$$
$$R'-O-CH_2$$

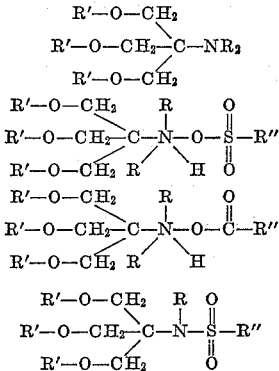

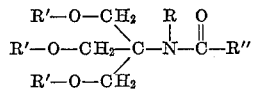

and

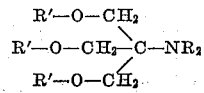

where R is hydrogen or a hydrocarbon group, R' is hydrogen, an acyl group or a hydrocarbon radical, and R" is a hydrocarbon radical. In accordance with this invention, these novel additives are incorporated in gasoline hydrocarbons or in jet fuel hydrocarbons in minor amount sufficient to suppress icing of the fuel during engine operation.

The novel additives used in this invention comprise tri-(hydroxymethyl) aminomethane and derivatives thereof. Compounds having the structural formula:

$$R'-O-CH_2$$
$$R'-O-CH_2-C-NR_2$$
$$R'-O-CH_2$$

where R is hydrogen or a hydrocarbon group and R' is hydrogen, an acyl group, or a hydrocarbon group, can be used. The hydrocarbon groups can be alkyl, cycloalkyl, aryl, aralkyl, or alkaryl groups, preferably having about 1–15 carbon atoms per group. Acyl groups such as acetyl, propionyl, benzoyl, stearoyl, naphthoyl, and the like are suitable. Specific examples of suitable additives for use in this invention having the above formula are tri-(hydroxymethyl) aminomethane, tri-(methoxymethyl) aminomethane, tri-(acetoxymethyl) aminomethane, tri-(ethoxymethyl) aminomethane, tri-(phenoxymethyl) aminomethane, N-dibutyl tri(methoxymethyl) aminomethane, ethoxymethyl di-(methoxymethyl) aminomethane, and the like.

Other novel additives used in the invention are formed by reacting the above compounds with sulfonic acids or carboxylic acids to form salts or to form amides or sulfonamides. The so-formed salts have the following formulas:

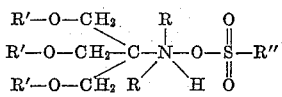

and

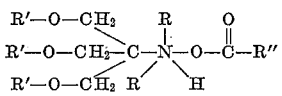

where R and R' are as above described, and where R" is a hydrocarbon radical preferably having 10 to 30 carbon atoms, e.g., the hydrocarbon portion of naphthenic acid or mahogany sulfonic acid. Especially suitable for use in the present invention are the mahogany sulfonic acid salt of tri-(hydroxymethyl) aminomethane and the naphthenic acid salt of tri-(hydroxymethyl) aminomethane which are formed respectively by reacting tri-(hydroxymethyl) aminomethane with petroleum mahogany sulfonic acids, or with petroleum naphthenic acids at mild temperatures, i.e., temperatures below about 250° F. The salts of other sulfonic and carboxylic acids such as dodecylbenzene sulfonic acid, stearic acid, and the like can be suitably employed in the invention.

In addition to the above sulfonic and carboxylic salt derivatives, amide and sulfonamide derivatives can be used in the invention. These compounds have the structural formulas:

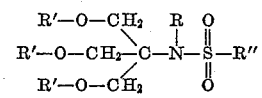

and

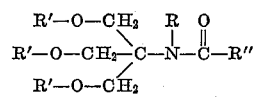

where R and R' are as above described and where R" is a hydrocarbon radical preferably having 10 to 30 carbon atoms, e.g., the hydrocarbon portion of mahogany sulfonic acid or naphthenic acid. Especially suitable for use in this invention are the mahogany sulfonic acid sulfonamide of tri-(hydroxymethyl) aminomethane and the naphthenic acid amide of tri-(hydroxymethyl) aminomethane which are formed respectively by reacting tri-(hydroxymethyl) aminomethane with petroleum mahogany sulfonic acids or with petroleum naphthenic acids at relatively severe conditions, i.e., 400° F. or higher. Other sulfonic and carboxylic acids such as dodecylbenzene sulfonic acid, stearic acid, and the like can be used to prepare compounds as above described which are suitable for use in the invention.

In carrying out one embodiment of the present invention, the novel fuel additives are incorporated in minor amount sufficient to suppress carburetor icing in gasoline hydrocarbons which are normally used as fuel in spark ignition internal combustion engines. These gasoline hydrocarbons boil in the range of about 80° F. to 440° F., and usually in the range of about 90° F. to 400° F. The gasoline compositions of the present invention can contain, in addition to tri-(hydroxymethyl) aminomethane and derivatives thereof, any of the fuel additives which are commonly employed in the art. It is preferred to use organo metallic anti-knock agents such as tetraethyl lead, iron carbonyl, and bis-cyclopentadienyl iron in the gasoline compositions of this invention. Such anti-knock agents are generally used in amounts of about 0.5 to 5 cc. per gallon of fuel. Scavenging agents can be used with these anti-knock additives. Other additives, such as anti-rust additives, upper cylinder lubricants, and the like, can also be used to advantage in the novel gasoline formulations of the instant invention.

The tri-(hydroxymethyl) aminomethane and derivatives thereof as above described are added to the gasoline hydrocarbons in small but sufficient amount to suppress carburetor icing of the internal combustion engine. Generally, amounts of the anti-icing agents in the range of about 0.05% to 2% by volume of the fuel and preferably 0.1% to 1% are suitable to suppress carburetor icing. However, amounts outside this range can, on occasion, suitably be used. The anti-icing additives are generally sufficiently soluble in gasoline as not to require use of a mutual solvent, although if desired such solvents can be employed.

In a second embodiment of the present invention, tri-(hydroxymethyl) aminomethane and its derivatives, as described above, are incorporated in a hydrocarbon jet propulsion engine fuel in small but sufficient amount to suppress icing tendencies of the fuel during jet engine operation. Usually amounts of the anti-icing additives in the range of about 0.05% to 2% by volume of the jet fuel, preferably 0.1% to 1% of the fuel, are sufficient to effectively suppress icing. Amounts outside this range can, however, be used.

The jet fuel used in this embodiment of the invention can be any of the hydrocarbon fuels conventionally employed as fuel for jet propelled aircraft. Jet fuel normally comprises hydrocarbons boiling in the range of about 100° F. to 600° F., and has a freezing point below about −76° F. A description of jet engine fuel properties is given by C. W. Kelley in the November 1952 edition of The Petroleum Engineer on pages C–7 to C–9.

The following illustrates a practice of the first described embodiment of the invention:

Tri-(hydroxymethyl) aminomethane is reacted with petroleum naphthenic acids in substantially equimolar proportions at a temperature of about 450° F. The petroleum naphthenic acids have an acid number of about 150. The resulting reaction product, which comprises the naphthenic acid amide derivative of tri-(hydroxymethyl) aminomethane, is incorporated in gasoline hydrocarbons in amount of 0.1% by volume of the hydrocarbons. The resulting gasoline composition when used as fuel in spark ignition internal combustion engine effectively resists carburetor icing.

The following illustrates a practice of the second described embodiment of the invention:

Tri-(hydroxymethyl) aminomethane is reacted with petroleum mahogany sulfonic acids in substantially equimolar proportions at about 450° F. The resulting product, comprising the mahogany sulfonic acid sulfonamide of tri-(hydroxymethyl) aminomethane, is incorporated in JP–4 hydrocarbon jet engine fuel in amount such that the sulfonamide comprises 0.1% by volume of the fuel. This jet engine fuel can be used in propelling jet aircraft at lower temperatures without icing than could the original JP–4 fuel.

I claim:

1. Composition consisting essentially of a liquid hydrocarbon fuel selected from the group consisting of gasoline and a jet engine fuel fraction of petroleum hydrocarbons boiling in the range of from about 100° F. to about 600° F., and from about 0.05 to about 2.0 percent by volume of a compound having a formula selected from the group consisting of:

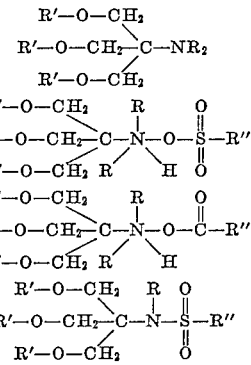

and

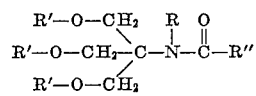

where R is selected from the group consisting of hydrogen and 1 to 15 carbon atom alkyl, alkaryl, cycloalkyl, aryl and aralkyl groups; R' is selected from hydrogen, acyl groups and 1 to 15 carbon atom alkyl, alkaryl, cycloalkyl, aryl and aralkyl groups; and R" is selected from 10 to 30 carbon atom naphthenic acid and mahogany sulfonic acid hydrocarbon groups.

2. Composition according to claim 1 wherein said compound has the formula:

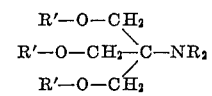

3. Composition according to claim 2 wherein said compound is tri-(hydroxymethyl) aminomethane.

4. Composition according to claim 1 wherein said compound has the formula:

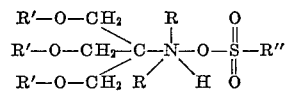

5. Composition according to claim 4 wherein said compound is the mahogany sulfonic acid salt of tri-(hydroxymethyl) aminomethane.

6. Composition according to claim 1 wherein said compound has the formula:

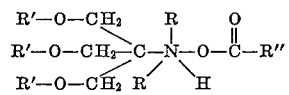

7. Composition according to claim 6 wherein said compound is the naphthenic acid salt of tri-(hydroxymethyl) aminomethane.

8. Composition according to claim 1 wherein said compound has the formula:

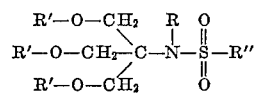

9. Composition according to claim 8 wherein said compound is the mahogany sulfonic acid sulfonamide of tri-(hydroxymethyl) aminomethane.

10. Composition according to claim 1 wherein said compound has the formula:
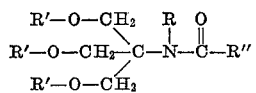
11. Composition according to claim 10 wherein said compound is the naphthenic acid amide of tri-(hydroxymethyl) aminomethane.
References Cited in the file of this patent
UNITED STATES PATENTS
| | | |
|---|---|---|
| 2,174,242 | Hass et al. | Sept. 26, 1939 |
| 2,533,303 | Watkins | Dec. 12, 1950 |
| 2,550,982 | Eberz | May 1, 1951 |
| 2,784,067 | Duncan | Mar. 5, 1957 |